June 13, 1944.  L. R. BUCKENDALE  2,351,001
SUSPENSION FOR MULTIWHEEL VEHICLES
Filed Jan. 6, 1943  3 Sheets-Sheet 1
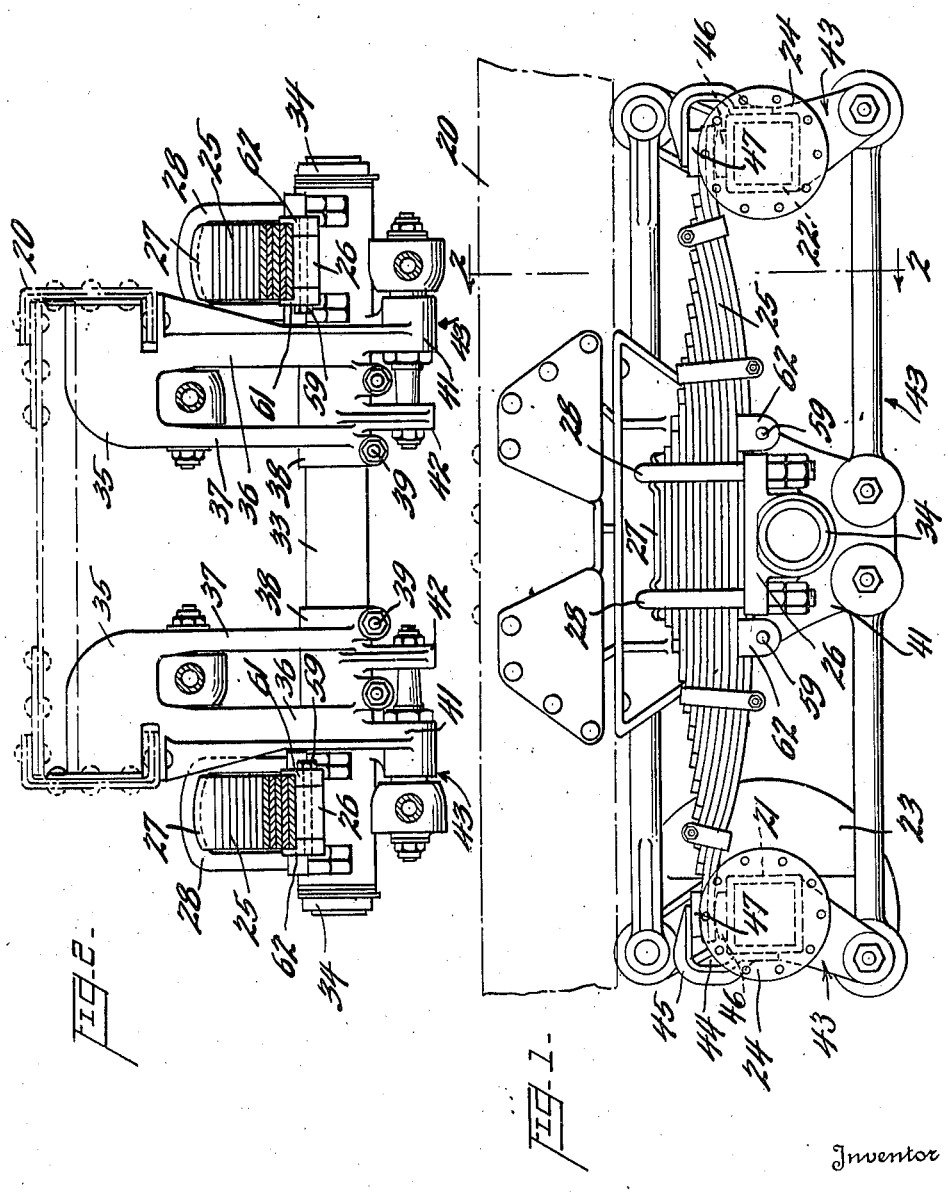
Inventor
Lawrence R. Buckendale,
By Strauch & Hoffman
Attorneys June 13, 1944. L. R. BUCKENDALE 2,351,001
SUSPENSION FOR MULTIWHEEL VEHICLES
Filed Jan. 6, 1943 3 Sheets-Sheet 2
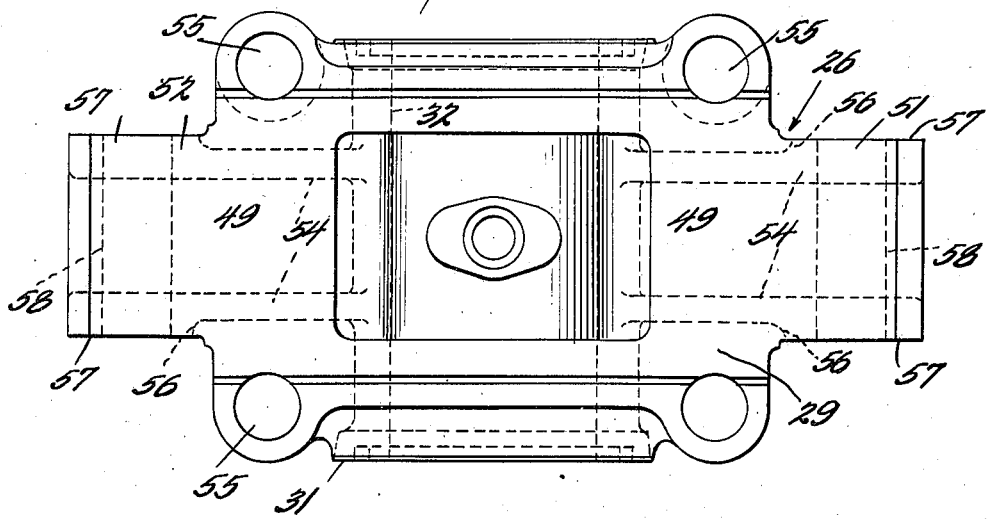
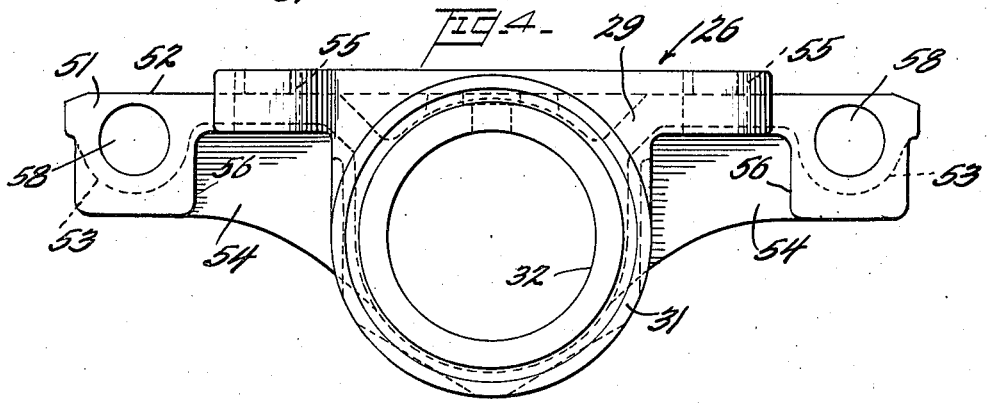
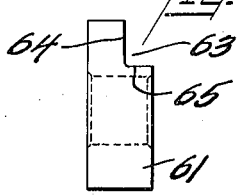
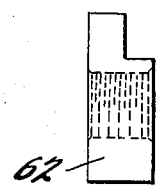
Inventor
Lawrence R. Buckendale,
By Strauch & Hoffman
Attorneys June 13, 1944.   L. R. BUCKENDALE   2,351,001
SUSPENSION FOR MULTIWHEEL VEHICLES
Filed Jan. 6, 1943    3 Sheets-Sheet 3
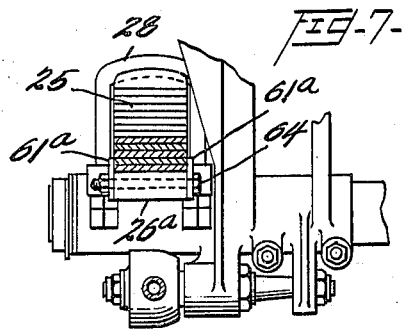
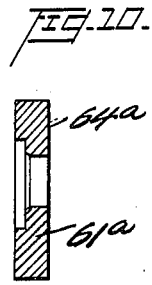
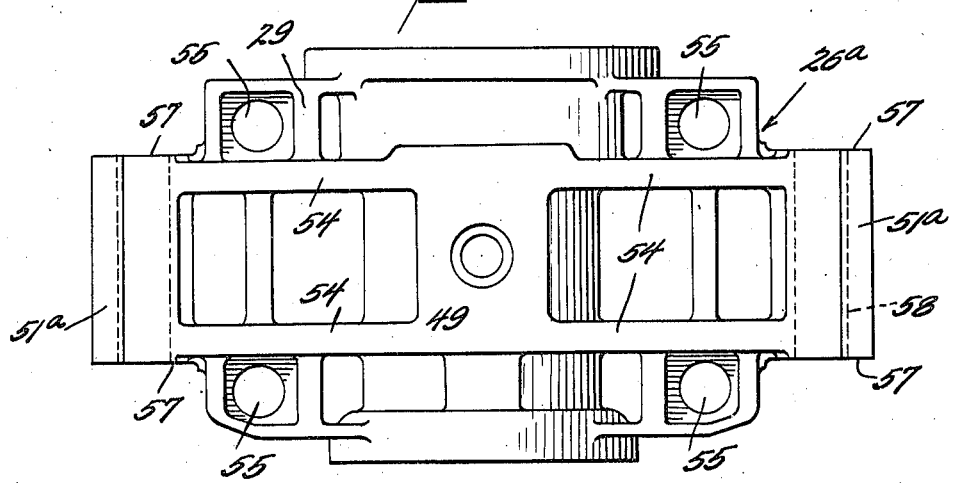
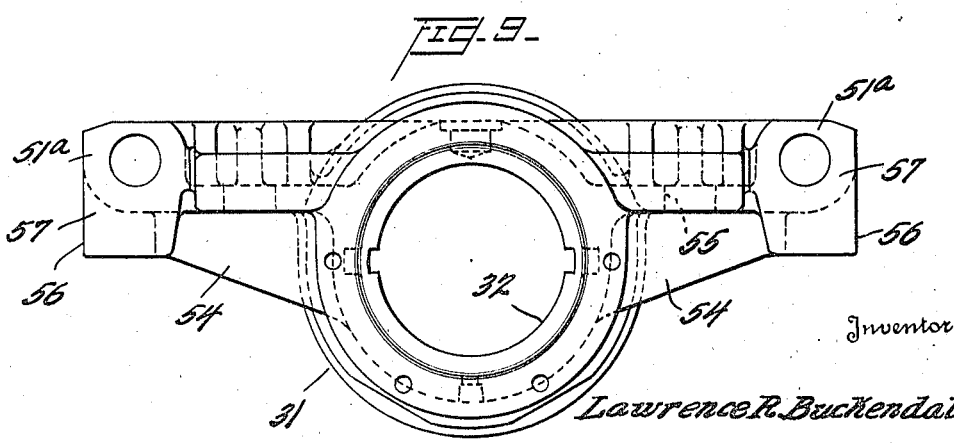
Inventor
Lawrence R. Buckendale,
By Strauch & Hoffman
Attorneys Patented June 13, 1944

2,351,001

UNITED STATES PATENT OFFICE 2,351,001

SUSPENSION FOR MULTIWHEEL VEHICLES

Lawrence R. Buckendale, Detroit, Mich., assignor to The Timken-Detroit Axle Company, Detroit, Mich., a corporation of Ohio Application January 6, 1943, Serial No. 471,493

5 Claims. (Cl. 280—124)

This invention relates to improvements in multi-wheel vehicles. More particularly this invention relates to improvements in suspensions of the type shown and described in the patent of Herbert W. Alden No. 2,078,521 issued April 27, 1937.

In suspension systems of this type, the springs are carried by a cross-tube and are employed to prevent excessive axial movement of the axles laterally of the vehicle frame. Utilization of the springs for this purpose prior to adoption of the Alden construction of Patent 2,078,521 resulted in repeated lateral stresses on the spring clips so that the latter became loosened permitting destructive lateral forces to be directed to the torque rods or other parts of the suspension with frequent resultant failures of the latter. These objections were overcome by the structure of Patent 2,078,521. While that structure represented a marked advance in the art, experience in the field, however, disclosed that the side or clamp plates in this construction were "cocked" slightly forming a truncated V shaped recess between the cooperating plates and that the spring, therefore, was not gripped by the plates as securely as desired. In an effort to cure this difficulty, the clamp bolts were tightened further. This overloaded the clamp bolts and caused an undesired distortion of the spring seat. As a consequence, a binding action was set up between the spring seat and cross-tube, which impeded the desired free pivotal action and the clamp bolts would frequently break after short service. Continued efforts over a period of years to overcome these objectionable features of the Alden construction resulted in the present invention.

The principal object of this invention is, therefore, to improve the suspension of Patent 2,078,521 to secure the full advantages of the patented structure while avoiding the service troubles encountered in commercial use of the Alden suspension and seat.

More particularly it is an object of this invention to provide a multi-wheel suspension comprising an improved spring seat permitting the spring to swing accurately and freely in a plane substantially at right angles to the pivotal axis of the spring seat while preventing excessive movement of the tandem axles laterally of the frame.

A further object of the present invention is to provide the spring seat with self-aligning clamp plates adapted to engage the sides of the lower leaves of springs of different width.

A still further object of this invention is to provide the spring seat with clamps adapted to securely grip the sides of the lower leaves of the spring upon threading the shank of the clamp bolt into one of the clamps.

Further objects of the invention will appear as the description thereof proceeds with reference to the appended claims and accompanying drawings wherein:

Figure 1 is a side elevational view of a tandem axle arrangement illustrating a preferred embodiment of the present invention;

Figure 2 is a sectional view taken on line 2—2 of Figure 1 and looking in the direction of the arrows. For clarity of illustration in Figures 1 and 2, the wheels and brake assemblies are removed and an end of the chassis frame is shown in broken lines;

Figure 3 is an enlarged plan view of the spring seat or saddle embodied in the suspension used in Figures 1 and 2;

Figure 4 is a side elevational view of the spring seat or saddle of Figure 3;

Figures 5 and 6 are enlarged side elevational views of the detachable clamps used with the spring seat of Figures 1 to 4;

Figure 7 is a fragmentary view of a tandem axle arrangement illustrating a modified embodiment of the present invention;

Figure 8 is an enlarged plan view of the spring seat or saddle embodied in the suspension used in Figure 7;

Figure 9 is a side elevational view of the spring seat or saddle of Figure 3; and Figure 10 is a side elevational view of the detachable clamp used with the spring seat of Figures 7 to 9.

With continued reference to the drawings wherein like reference numerals are employed to designate the same parts throughout the several views and with particular reference to Figures 1 to 6, numeral 20 designates the longitudinal side frame members of a motor vehicle. Beneath the frame is disposed a pair of tandem axles comprising a drive axle assembly 21 and a dead axle 22. Either of these axles may be dead or driven or both of them may be driven. The drive axle assembly is adapted to receive wheel driving axles driven in well known manner by a propelling mechanism generally denoted at 23. The dead or trailing axle 22 may be of any desired formation and is illustrated as of tubular form with ends like the drive axle ends. The ends of both axles are adapted for connection to conventional road wheels and for this purpose each has a flange 24 designed to have a wheel mounting (not shown) secured thereto so that the housings are supported by the wheels.

The axle assemblies are yieldably associated with the vehicle chassis by a pair of leaf springs 25 each one of which is pivoted between its ends on a side of the vehicle frame and has its ends extending between adjacent ends of the axle assemblies and supported thereon in a manner hereinafter described. The central mounting for each spring comprises a spring seat or saddle member 26 upon which the mid-portion of the spring is secured by a plate member 27 and associated clips in the form of a pair of U-bolts 28.

Saddle 26 consists of a body portion 29 (see Figures 3 and 4) which has a depending boss 31 cylindrically bored at 32 transversely of the seat so as to rotatably engage and support one end of a frame-carried cross-tube or trunnion shaft 33 that extends transversely of the vehicle intermediate the axle assemblies 21 and 22. The trunnion shaft ends extend beyond the longitudinal side frame members 20. The springs thus are adapted to oscillate about the axis of the trunnion shaft. The ends of the trunnion shaft may be closed in any suitable manner and are provided with adjustment and washer assemblies 34 which abut the outer ends of the depending bosses 31 of spring seats 26 and prevent axial outward movement of the seats along the trunnion shaft. The latter is secured to the frame by angle brackets 35 in the manner disclosed in Alden Patent 2,078,521. Since the manner of securing brackets 35 to frame members 20 is fully disclosed in said patent, a more detailed description will not be given at this time.

Each angle bracket 35 has rigid depending spaced arms 36 and 37 which as shown are integrally connected to a sleeve member 38 which receives the trunnion shaft. Each sleeve 38 is split at the bottom and secured to the trunnion shaft by clamp bolts 39. The spring seats are freely journalled between these sleeves 38 and the nut and washer assemblies 34, and are restrained against endwise movement in both directions thereby, and hence the springs are confined to oscillation in predetermined vertical planes. Each angle bracket 35 is further provided with depending spaced arms 41 and 42 which extend below the trunnion shaft 33 and form a part of a torque or radius rod assembly 43 fully described in the above-mentioned Alden patent. Torque assembly 43 functions in the usual manner to locate the axles longitudinally of the vehicle and to prevent rotation of the axles about their axes, while simultaneously permitting the suspension to have a proper degree of flexibility when the tandem wheels pass over road irregularities.

Each of the springs 25 has its opposite ends inserted in recesses 44 provided therefor above the axles by bracket members 45 adjacent the ends of the respective axles. These brackets may be cast integrally with the axle housings or as shown may be connected to the housings by welding or the like. The ends of the springs rest on buttons 46 which are positioned interiorly of the recesses 44 and are welded to the upper surface of the housings. The spring supporting surface of each button 46 is shaped or curved convexly so as to permit the end of the spring to rock as well as slide thereon when the spring is deflected.

Abutments 47 are formed on or secured to the axle housings adjacent the inner sides of the ends of the springs. Each of the side abutments 47 is approximately the same height as the spring ends and are spaced therefrom slightly—e. g., about one-fourth inch. The brackets 45 are open on both sides as well as in the front end, thus while loosely confining the spring ends therein, permit free relative movement of the spring and axle housing in various horizontal directions. Abutments 47 allow only a limited inward lateral movement of the spring ends to permit a desired slight automatic steering or tracking action of the tandem wheels and thus avoid drag when rounding curves. This movement and the slight vertical freedom of the spring ends, furthermore, are necessary to permit one end of an axle to tilt vertically with respect to the other without twisting the springs.

As a result of the above-described arrangement, any endwise axial movement of the axles will be resisted or checked when the spring ends come into lateral contact with the side abutments 47. Up to the time of this contact, the only resistance to the axial movement is in the torque rods, and thereafter the further tendency for lateral axial movement is absorbed by both the rods and the springs. The rods and their connections will not withstand, without failure, the stresses that may be set up by too great an axial lateral movement of the axles, and, accordingly, the springs must be properly designed and must swing accurately in defined vertical planes so that they will always come into action and perform their function at the right time. While this end was secured by the above-mentioned patented Alden construction, an improved suspension having substantially longer life is provided by the present invention in the following manner:

As shown best in Figures 3 and 4, the spring seat 26 embodied in Figures 1 and 2, has, in addition to planar seating surface 49, integral, uninterrupted, longitudinally extending end portions 51 providing rigid extensions 52 of surface 49. End portions 51 are of substantially less width than body 29 and have transversely extending depending bosses 53, which function as compression members to resist distortion of the seat in response to tightening the clamp bolts, in a manner to be later described. The bosses are connected to body 29 by spaced, longitudinally extending webs 54. Webs 54 are connected to body 29 inwardly of apertures 55 which are adapted to receive the legs of U-bolts 28 and have enlarged end flanges 56 forming the ends of bosses 53. The exposed vertical faces of flanges 56 are machined to provide vertical surfaces 57 normal to the plane of surfaces 49 and 52 and transversely extending bores 58 are formed in bosses 53 for a purpose to be presently pointed out.

Referring to Figure 2, it will be seen that the longitudinal edges of springs 25 overhang surfaces 57 for a substantial distance and are firmly gripped by suitable clamping assemblies mounted on end portions 51 of seat 26. Each clamping assembly comprises a clamp bolt 59 and a pair of clamp plates 61 and 62. Clamp bolt 59 is preferably inserted from the inner side of seat 26 passing first through clamp plate 61 and then through bore 58 and into clamp plate 62. As the width of multi-wheel vehicles is controlled by statutes in most states and the maximum load carrying space is preferably sought in all such vehicles, the larger vehicles have little side clearance between the tires of the wheels and the side frame members 20 which are usually spaced apart as far as possible to assure transverse stability of the body. Consequently, it is desirable to limit the width of the wheel suspension as much as possible in order to obtain the desired transverse body stability. In the present form of this invention, this end is expedited by eliminating the conventional nut for the clamp bolts 59 and internally threading the clamp plate 62, the outer vertical face of which is in substantially the same vertical plane as the outer vertical face of seat 26. It will be appreciated that tightening of bolts 59 draws the associated clamp plate 61 and 62 into firm lateral clamping engagement with the longitudinal edges of the springs and end faces 57, and positively and non-yieldingly confines the springs to swinging movement in a vertical plane that is precisely perpendicular to the axis of trunnion shaft 33. Also, since bosses 53 extend from side-to-side of the seats, the latter are adequately reinforced against distortion, even when the bolts are taken up with sufficient force to cause the clamp plates to tightly grip end surfaces 57 of the seat.

While clamp plates 61 and 62 may be formed with any suitable configuration so long as an adequate thread length is provided in plate 62 to assure proper strength, it is a feature of this invention to provide interchangeable self-aligning clamp plates having spring receiving notches of varying widths to adapt a standard spring seat for use with springs of varying width. Referring to Figures 2, 5 and 6, this end is accomplished by notching one of the upper faces of clamp plates 61 and 62 at 63 to provide an inwardly disposed vertical clamping face 64 a horizontal, aligning shoulder 65 adapted to engage the under surface of the bottom leaf of springs 23, and a vertical face adapted to cooperate with end faces 57 of the seat. By varying the width of notches 63, clamp plates 61 and 62 may be selectively chosen to properly clamp the edges of varying width springs. Clamp plates 61 and 62 are initially assembled with shoulder 65 engaging the under surface of the bottom leaf spring and bolt 59 is then tightened, the engagement of shoulder 65 and the spring being relied upon to maintain the clamp plates in proper aligned position during the tightening operation.

While the operation is believed clear from the foregoing description, it may be summarized as follows:

One or the other of the side abutments of the axles is adapted to engage the adjacent spring end after a predetermined axial movement of the axle laterally of the vehicle and thus resist further axial movement. The loose connections between the ends of the springs and the axle housings permit the ends of the springs to rock, as well as slide freely on the axle housings in response to deflection of the springs incident to load and shock distribution so that automatic steering of the tandem wheels is permitted within the limits of flexibility of the torque rods, after which the springs cooperate with the recessed brackets in which they operate and due to their transverse rigidity prevent excessive forces from being directed laterally of the torque rods.

These lateral forces applied at the spring ends are transmitted through the spring to the clamping assemblies which in turn rigidly resist the lateral forces and compel the spring to swing accurately in the predetermined plane at right angles to the cross-tube or trunnion shaft and thus prevent excessive lateral or endwise movement of the vehicle axles with the result that there is small possibility of failure in the spring clip and consequent direction of destructive lateral forces to the torque arms with resultant failure.

It, of course, will be understood that the spring clips 28 will augment the action of clamp assemblies whenever a spring of sufficient width to contact the vertical legs of clips 28 is employed.

Referring to the modified form of invention illustrated in Figures 7 to 10, there is a modified seat 26a, the only substantial differences residing in the fact that end portions 51 are replaced by end portions 51a extending the full width of body 29 and the substitution of clamp assemblies comprising identical pairs of clamp plates 61a of uniform thickness and bolt and nut assemblies 64 designed to secure clamp plates 61a to modified seat 26a. It will be appreciated that since extensions 51a are equal in width to body 29 springs 25 do not substantially overhang vertical surfaces 57 and that the clamp surface 64a of clamps 61a are approximately in the plane of the innermost vertical side of the legs of U-bolts 28. While the clamp plates 61a of this form of the invention are not inherently self-aligning or capable of accommodating springs of varying width, these functions can be incorporated in the plates merely by thickening the upper portion of the plate to provide an overhanging boss designed to freely slide along the surfaces 52a upon tightening of bolt and nut assemblies 64.

While this invention has been described for use with the specific spring and torque rod arrangements of the Alden patent, it is to be understood that it is not limited to use with this specific design but may be employed with any suspension wherein the springs are designed to limit lateral, axial movement of the axles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a multi-wheel vehicle having a frame, a pair of tandem axles disposed at one end of the frame and a suspension at each side of the frame for supporting the latter upon the axles, and in which each suspension includes a leaf spring extending longitudinally of the frame, with its mid-portion pivotally connected thereto and having its ends secured to the axles through connections designed to limit relative axial shifting movement of the axles and frame, a rigid seat assembly for pivotally mounting said leaf spring upon said frame, comprising a seat providing an elongated, longitudinally extending bearing surface upon which the spring is adapted to rest; pairs of clamp plates coacting with the ends of said seat and adapted to be drawn into lateral engagement with the sides of said spring and with opposed pairs of side faces provided adjacent the ends of said seat, to positively insure maintenance of the longitudinal center line of said spring within a predetermined vertical plane extending longitudinally of the vehicle; and means for positively drawing said clamp plates into said lateral engagements, the ends of said seat being strongly resistant to lateral compressive forces, whereby when said adjustable means is taken up said spring seat will adequately resist distortion.

2. The construction defined in claim 1, wherein said clamp plates are each notched to provide shoulders lying in the plane of said elongated bearing surface, for engaging the under surface of said spring, whereby said clamp plates are retained in proper position while being tightened.

3. In a multi-wheel vehicle of the type including longitudinal frame members supported on tandem sets of wheels through suspensions embodying leaf springs which have pivotal connections with the frame members, mounting assemblies for pivotally securing said springs to said frame members, comprising transversely apertured, longitudinally extending, rigid seats adapted to be pivotally mounted on said frame members and having elongated, upwardly facing, longitudinally extending bearing surfaces adapted to support the mid-portions of said springs; spring clips disposed inwardly of the ends of said seats and adapted to clamp said leaf springs on said seats adjacent said transverse aperture; cooperating pairs of detachable clamp plates fitting over the side faces of each of said spring seat ends and adapted to be drawn into lateral engagement with the latter and with said leaf springs, to confine the springs to swinging movement in a vertical plane; means cooperating with said clamp plates for positively drawing them into said lateral engagement with the sides of said spring and into clamping engagement with the side faces of said seat ends, the latter being solid from side-to-side between the side faces of said seat ends, for resisting compressive forces set up when said clamp plates are drawn into final position.

4. In a spring mounting assembly for pivotally connecting the leaf springs for the tandem sets of wheels of a multi-wheel vehicle to the framework of the vehicle for swinging movement in the vertical plane, spring seats for securing said leaf springs to said frame, each spring seat comprising a body providing a substantially planar, elongated spring seating surface and longitudinally spaced, spring clip receiving apertures adjacent its ends; a depending boss formed on said body having an aperture therein adapting said spring seat for pivotal connection to said frame; rigid, non-yielding, longitudinally extending end portions at the ends of said body providing continuations of said planar surface and having inner and outer pairs of vertical side faces disposed in parallel planes normal to said seating surface, said end portions each having a bore parallel to said aperture and opening onto said side faces; clips adapted to secure a leaf spring to said seating surface, with its center line in the vertical plane of the longitudinal center line of said seating surface; sets of inner and outer clamp plates coacting in surface engagement with the inner and outer side faces of said end portions and extending upwardly above said planar surface and operable to laterally engage the sides of said leaf spring and positively confine the latter to bodily swinging movement with said seat in a vertical plane; and threaded means passing freely through at least one of each set of said clamp plates and said bores for positively drawing said clamp plates into said lateral engagements with said spring and said vertical faces, said end portions of said body sufficiently resistant to transverse compressive forces to preclude distortion of any part of said spring seat when said threaded means is taken up.

5. The construction defined in claim 4, wherein said threaded means comprises a headed bolt, and the outer clamp plate of each set is threaded and serves as a clamp nut.

LAWRENCE R. BUCKENDALE.